US010219530B2

(12) United States Patent
Yoshimoto et al.

(10) Patent No.: US 10,219,530 B2
(45) Date of Patent: Mar. 5, 2019

(54) BEVERAGE THAT IS GIVEN FRUIT SAVOR

(71) Applicant: Suntory Holdings Limited, Osaka (JP)

(72) Inventors: Norihiko Yoshimoto, Kanagawa (JP); Yohei Yasui, Kanagawa (JP); Yoshinori Senga, Kanagawa (JP)

(73) Assignee: SUNTORY HOLDINGS LIMITED, Osaka-shi, Osaka (JP)

(*) Notice: Subject to any disclaimer, the term of this patent is extended or adjusted under 35 U.S.C. 154(b) by 210 days.

(21) Appl. No.: 15/128,134

(22) PCT Filed: Apr. 7, 2015

(86) PCT No.: PCT/JP2015/060844
§ 371 (c)(1),
(2) Date: Sep. 22, 2016

(87) PCT Pub. No.: WO2015/156282
PCT Pub. Date: Oct. 15, 2015

(65) Prior Publication Data
US 2017/0105434 A1 Apr. 20, 2017

(30) Foreign Application Priority Data
Apr. 7, 2014 (JP) .................. 2014-079015

(51) Int. Cl.
A23L 2/56 (2006.01)
A23L 2/52 (2006.01)
A23L 2/60 (2006.01)

(52) U.S. Cl.
CPC .............. A23L 2/52 (2013.01); A23L 2/56 (2013.01); A23L 2/60 (2013.01); A23V 2002/00 (2013.01)

(58) Field of Classification Search
CPC ....................................... A23L 2/56
USPC ............ 426/330.3, 387, 533, 534, 590, 651
See application file for complete search history.

(56) References Cited

U.S. PATENT DOCUMENTS 4,938,985 A    7/1990   Swaine, Jr. et al.
4,973,485 A *  11/1990  Rich
2012/0282374 A1* 11/2012 Stillman

FOREIGN PATENT DOCUMENTS

EP    0357130 A2   3/1990

OTHER PUBLICATIONS

Da Porto, et al., "Effects of carbohydrate and noncarbohydrate sweeteners on the orange spirit volatile compounds", LWT—Food Science and Technology, Mar. 1, 2006, vol. 39, No. 2, pp. 159-165.
Nisperos-Carriedo, et al., "Comparisons of Volatile Flavor Components in Fresh and Processed Orange Juices", J. Agric. Food Chem, Apr. 1, 1990, vol. 38, No. 4, 1048-1052.
(Continued)

Primary Examiner — Helen F Heggestad
(74) Attorney, Agent, or Firm — Drinker Biddle & Reath LLP

(57) ABSTRACT

A beverage is provided that is given a colorless and transparent fruit savor that can be felt as the return aroma of fruit or a natural fruity taste, even when the beverage drunk directly from a container having a small opening like a PET bottle. The beverage satisfies "X≥0.01" and "Y≥3.1X+0.85" when the valencene concentration is set to X (mg/L), and the linalool concentration is set to Y (mg/L) in a colorless and transparent beverage.

7 Claims, 2 Drawing Sheets

(56) References Cited

OTHER PUBLICATIONS

Crupi, et al., "A comprehendsive study of the chemical composition and aromatic characteristics of lemon liquor", Food Chemistry, Jul. 19, 2007, vol. 105, No. 2, pp. 771-783.
EP Application 15776472.1—Extended European Search Report dated Oct. 4, 2017
International Search Report in PCT/JP2015/060844 dated Jun. 16, 2015.

* cited by examiner

BEVERAGE THAT IS GIVEN FRUIT SAVOR

This application is the National Stage of International Application No. PCT/JP2015/060844, filed Apr. 7, 2015, and claims benefit of Japanese Application No. 2014-079015 filed on Apr. 7, 2014.

TECHNICAL FIELD

The present invention relates to a beverage that is given fruit savor, particularly, a beverage that is given fruit savor but is colorless and transparent like water.

BACKGROUND ART

As consumers become more health conscious and nature oriented, flavored water gains popularity. A flavored water, also referred to as near-water, is a beverage that has a water-like appearance, and it is composed by adding flavors such as fragrance, essence and about 1% of fruit juice to mineral water.

It is noted that flavored waters, particularly those like near-waters that are colorless and transparent similar to water but has a fruit flavor are drunk "in place of water" as a beverage that is drunk when feeling thirsty, particularly when there is a desire to gulp down a substantial amount. However, commercially available near-waters are often considered unsatisfactory as beverages to be drunk "in place of water" due to their artificial scent or persistent sweetness, and there were remarks that their lightness in taste and watery quality reduce their drinkability.

The aroma felt by humans are said to be divided into two types, namely the orthonasal aroma and the retronasal aroma. The former is aroma that enters from the tip of the nose into the nasal cavity with inspiration, and the latter is aroma that travels through the throat to the nose when food is put in the mouth. The retronasal aroma is also called the "return aroma" and includes an aroma arising from a person chewing the food per se that traveled back from the throat to the nose, and aroma that is newly formed through the reaction of the food and various enzymes in the saliva when food is put in the mouth. There has been proposed as a beverage that focuses on the "return aroma" a soft drink having a wine savor having an improved lingering fruit aroma after the beverage has been swallowed (Patent Document 1).

CITATION LIST

Patent Document

Patent Document 1: Japanese Publication No. 2012-000032

SUMMARY OF INVENTION

Technical Problem

It is presumed that flavored waters packed in recappable containers, such as a PET bottle, will be drunk directly from containers and consumed regularly in place of water by the consumers. Drinking liquid directly from a container, such as a PET bottle, having a small opening differs from drinking from cups, etc. having a large opening in that the orthonasal aroma cannot be felt, and as such the retronasal aroma becomes an important factor. However, no beverage has been developed as flavored water that focuses on retronasal aroma. Flavored waters, particularly those having a colorless and transparent appearance like water, are bound by various limitations in design to maintain the water-like appearance, so it is difficult to enhance a specific aroma (retronasal aroma) of a colorless and transparent beverage.

The object of the present invention is to provide a beverage that allows the drinker to feel a fresh aroma and taste that are like natural fruit even when the beverage is drunk directly from a container with a small opening like a PET bottle, even though the beverage is colorless and transparent like water.

Solution to Problem

The present inventors conducted extensive studies to solve the above problem, and found that incorporating specific aroma constituents at specific range of concentrations in a beverage that is given a fruit savor by adding fruit fragrance would provide a beverage having a "return aroma" that is so fresh and rich in aroma that it calls forth an image of natural fruit.

The present invention encompasses the following without being limited thereby.
(1) A beverage that is given a fruit savor by adding fruit fragrance and that satisfies requirements (A) and (B):
(A) the beverage contains valencene and linalool as aromatic constituents, and satisfies formulas below:

$$X \geq 0.01$$

$$Y \geq 3.1X + 0.85$$

(X: valencene concentration, Y: linalool concentration (mg/L)); and
(B) a color of the beverage satisfies the following:
absorbance at a wave length of 660 nm≤0.06,
ΔE value (color difference) based on pure water≤3.5.
(2) The beverage according to (1), wherein the ΔE value (color difference) based on pure water is 1.2 or lower.
(3) The beverage according to either (1) or (2), further satisfying $Y \leq 75X - 2.0$.
(4) The beverage according to any one of (1) to (3), wherein an amount of linalool is 4.0 mg/L or lower.
(5) The beverage according to any one of (1) to (4), wherein an amount of valencene is 0.2 mg/L or lower.
(6) The beverage according to any one of (1) to (5) further containing a sweetening constituent, wherein the beverage has a Brix value of 3.0 to 6.0.
(7) The beverage according to any one of (1) to (6), which is a container-packed beverage packed in a container having an opening of 1200 mm² or smaller that serves as a mouth for drinking.

Advantageous Effects of Invention

The present invention provides a beverage that is colorless and transparent like water, but allows a vivid aroma of fruit (return aroma) to be felt when it is drunk. The beverage of the present invention is suitable to be packed in a container with a small opening (which generally inhibits the return aroma from being felt), in which the consumer may put his/her mouth directly on the container, such as a PET bottle, since the return aroma can be readily felt.

DESCRIPTION OF EMBODIMENTS

<Beverage that is Given Fruit Savor>

Figure 1:
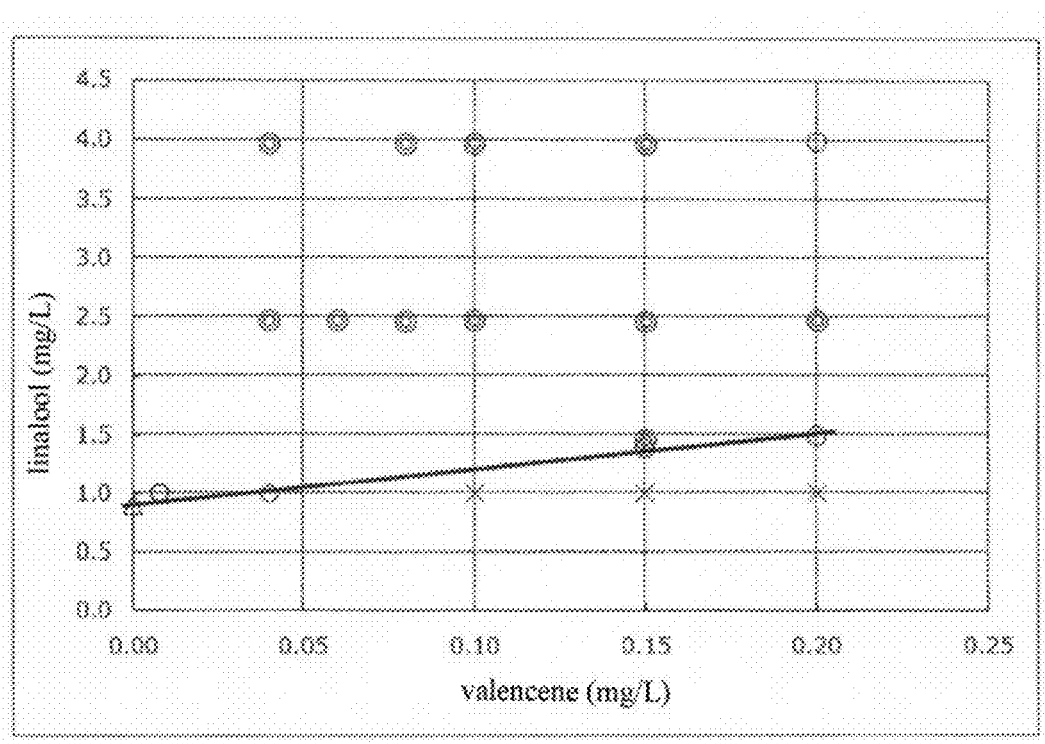
FIG. 1 is a graph of Test Products 1 to 20 and Commercial Product 1 shown in the Examples with the concentration of valencene on the x axis, the concentration of linalool on the y axis, and plotting an intensity of aroma that is 4 points or higher as "⊚@", an intensity of aroma that is 3.5 points or higher and lower than 4 points as "○", 3 points or higher and lower than 3.5 points as "Δ", and lower than 3 points as "x". The straight line in the graph of FIG. 1 represents y=3.1x+0.85.

The beverage that is given fruit savor of the present invention is a beverage having a savor of the fruit of Rutaceae *Citrus*, such as orange, mandarin, etc. In order to give fruit savor, fragrance that holds the savor of *citrus* fruits (also referred to as "fruit savor" in the present specification) is added to the beverage of the present invention. The fruit fragrance may be obtained from a natural source such as fruit juice and fragrant oil, or it may be synthesized. Or else, the fruit juice itself may be used as the fragrance constituent. When using fruit juice, it is preferable to use a transparent fruit juice that has been subjected to a transparency treatment in view of the influence of the fruit juice on the liquid color of the beverage. The fruit juice may be decolorized. With eye to maintaining the colorless and transparent liquid color and further maintaining that liquid color over an extended period of time during storage, the transparent fruit juice is used at a concentration of 5% or lower, preferably 2% or lower, more preferably 1.5% or lower, especially preferably 1.0% or lower. Selected as the type of fruit juice is that of *Citrus*, such as orange or mandarin, etc.

The beverage of the present invention obtained by adding fruit fragrance contains at least valencene and linalool as the fragrance constituent. Valencene is (1R)-1,2,3,5,6,7,8,8a-octahydro-1,8a α-dimethyl-7β-isopropenylnaphthalene (molecular formula $C_{15}H_{24}$, CAS No. 4630-07-3). Linalool is 3,7-dimethyl-1,6-octadien-3-ol (molecular formula $C_{10}H_{18}O$, CAS No. 78-70-6). Valencene is a constituent seen in the essential oil of orange, and linalool is a constituent seen in the essential oil of various plants such as rosewood, lavender, bergamot and coriander.

The beverage of the present invention includes valencene and linalool at a concentration that satisfies the formulas "X≥0.01" and "Y≥3.1X+0.85" when the concentration of valencene is X (mg/L) and the concentration of linalool is Y (mg/L). When the valencene and linalool are in the range of the above formula, it allows the "return aroma" traveling through the mouth to the nose to be felt significantly when the beverage is in the mouth. In particular, when X and Y are in the range of "Y≥3.1X+0.85" and "Y≤75X−2.0," the fruity taste similar to natural fruit may be felt in addition to the richness of a return aroma. The fruity taste similar to natural fruit mentioned herein refers to the fresh and invigorating aroma like a freshly squeezed orange, in other words, the aroma of essential oil that spreads when peeling *Citrus* fruits or the invigorating sweetness of the fruit experienced when eating *Citrus* fruits.

The mechanism that allows the beverage of the present invention to have a rich aroma is unknown, but constituents such as valencene or linalool in the beverage may travel backward from the throat to the nose due to the chewing exercise, and the temperature and moisture within the mouth. As shown in the Reference Examples described hereafter, there was no commercial *Citrus* savored beverage (Commercial Product 1: flavored water, Commercial Products 2 to 4: orange fruit beverage) whose concentrations of valencene and linalool satisfy the formula "Y≥3.1X+0.85." Note that the concentrations of valencene or linalool in the beverage may be measured by a method using a gas chromatograph mass spectrometer (GC/MS) shown in the Examples below.

The concentration of valencene in the beverage [X] is preferably 0.04 mg/L or higher and more preferably 0.07 mg/L or higher. A fruit fragrance containing valencene is often added to a beverage having an orange savor as an aroma constituent that characterizes *Citrus* (Japanese Publication No. 2009-203438 [Examples 1, 6]), but according to a study by the present inventors, when the valencene concentration is high in a colorless and transparent beverage, the oxygen and light causes the color and aroma to change, which may be problematic in an extended storage of the beverage (particularly, an extended storage in a transparent container). Fruitiness is synergistically improved in a beverage containing valencene and linalool of the present invention, and as such, the valencene concentration may be kept low in the present invention. The preferable valencene in the beverage of the present invention is 0.2 mg/L or lower, more preferably 0.15 mg/L or lower.

Furthermore, linalool is recognized as a constituent that disappears during storage (Toyo College of Food Technology, Toyo Food Research Center Report, 25, 35-47, (2004)), but the study by the present inventors showed that a combined use of a small amount of valencene makes it possible to control the decrease in the titer of linalool during storage. As seen, the beverage that satisfies "X≥0.01" and "Y≥3.1X+0.85" when the valencene concentration is X (mg/L), and the linalool concentration is Y (mg/L), has a rich return aroma and maintains the savor during extended storage. The concentration of linalool in the beverage is set to a concentration that satisfies the above formula against the concentration of valencene, but the linalool concentration of 4.0 mg/L or lower is preferred since a linalool concentration that exceeds 4.0 mg/L tends to cause acridity. In view of the vividness of the return aroma and the fruity taste, it is most preferable for the valencene and linalool to be in a range of concentration satisfying the above formula, and the valencene being 0.07 to 0.15 mg/L and the linalool being 1.5 to 2.5 mg/L.

The concentrations of valencene and linalool in the beverage may be adjusted by the type and amount of the fruit fragrance (including fruit juice) to be used.

Valencene and linalool may be incorporated in an amount of 10 to 35% against the total amount of the aroma constituent. The aroma constituents mentioned herein are volatile low molecular organic compounds contained in a container-packed beverage, which are a group of typical compounds influencing the aroma of the fruit savored beverage. The group of compounds that influence the aroma of fruit savor include limonene, terpenoids such as linalool, aldehydes such as hexanal, and octanal, and other oxygen-containing compounds such as alcohols, ketones and esters. The total amount of aroma constituents mentioned herein refer to the total amount of the group of compounds listed above, such as ethyl butylate, hexanoate, myrcene, limonene, citral, measured by quantitative analysis using a gas chromatograph mass spectrometer (GC/MS).

<Colorless and Transparent Beverages>

In the past, it was difficult to give a fruity taste like natural fruit to water while maintaining a colorless and transparent appearance of water and a fresh aftertaste. For example, when an opaque fruit juice is added to water, the water turns somewhat white and loses its transparency. In addition, the fresh aftertaste is lost by an influence of pulp derived from an opaque fruit juice. When transparent fruit juice is added to water to maintain transparency, color is added to water so that it is no longer colorless. Furthermore, the process of obtaining transparency of fruit juice removes the opaque constituent derived from fruit, so that it becomes less like a genuine fruit. When an extremely small amount of transparent fruit juice, at a level that does not color water, is added, the beverage becomes even more light tasting, and the fresh savor of a genuine fruit does not appear. Also, a fruit juice, even if it was a transparent fruit juice, may brown over time so that it loses its colorless quality. When sugar is used to reproduce the fruit sweetness, the freshness of the aftertaste tends to be lost. When fragrance alone is used instead of fruit juice or sugar, the aroma is singularly enhanced, so that its balance with taste is lost. Because of these difficulties, there was no flavored water that provides both a colorless and transparent appearance and a fruity taste like natural fruit.

On the other hand, the beverage of the present invention is a new type of beverage characterized by allowing the invigorating sweetness and aroma of fruit to be felt as a return aroma while providing a colorless and transparent appearance like water and a fresh aftertaste, and allowing the fresh aroma and taste like natural fruit to be felt even when the beverage is drunk directly from a container with a small opening like a PET bottle.

When "the beverage is transparent," it means that the beverage is visually transparent like water and has no cloudiness like isotonic drinks or turbidity like opaque fruit juice. The transparency of a beverage may be quantified using a known means for measuring the turbidity of liquid. For example, those beverages having an absorbance of 0.06 or lower at a wavelength of 660 nm measured using an ultraviolet and visible spectrophotometer (UV-1600 (Shimadzu Corporation)) may be referred to as "transparent."

When "the beverage is colorless," it means that the beverage has no color that can be visually acknowledged. The color of the beverage may, for example, be quantified using a known method for measuring the color difference of the object. For example, the beverage may be referred to as "colorless" when the transmitted light measured using the colorimetric color difference meter (ZE2000 (Nippon Denshoku Industries Co., Ltd.)) with pure water set as the basis has an $\Delta E$ value of 3.5 or lower. The $\Delta E$ value is preferably 2.3 or lower, and most preferably 1.2 or lower.

<Other Constituents>

A fruity taste like natural fruit may be felt more clearly when a sweetening constituent is added in addition to the fruit fragrance. Any sweetening constituent may be used as long as it is a constituent that gives sweetness, and natural sweeteners such as fructose, sugar, fructose grape sugar liquid sugar, grape sugar, malt sugar, cane sugar, high fructose liquid sugar, sugar alcohol, oligosaccharide, honey, sugarcane extract (brown sugar molasses), mizuame, *stevia* powder, *stevia* extract, *Siraitia grosvenorii* powder, *Siraitia grosvenorii* extract, *glycyrrhiza* powder, *glycyrrhiza* extract, *Thaumatococcus daniellii* seed powder, *Thaumatococcus daniellii* seed extract, and artificial sweeteners such as acesulfame potassium, sucralose, neotame, aspartame, saccharin. Among those, it is preferable to use natural sweeteners from the view point of freshness, drinkability, natural taste and appropriate richness, and fructose, grape sugar, malt sugar, cane sugar and sugar are preferably used. These sweetening constituents may be used alone, or multiple types may be used together.

When adding sweetening constituents, they should be added so that the Brix value of the beverage is 3.0 to 6.0, preferably 4.3 to 4.7. Brix is the value measured as the sugar refractometer index. The beverage of the present invention in this range does not wane in the cooling sensation or freshness, in particular, no unpleasant aftertaste remains in the latter half of drinking, and it provides excellent freshness in the mouth. Furthermore, the appearance of the beverage does not easily change over time even when the beverage is packed in an oxygen transmitting container, or packed in a transparent container and placed under a light, and the colorless and transparent liquid color under oxygen transmittance and light radiation is extremely stable. When the Brix value falls outside the above range, the beverage savor becomes uncoordinated.

In addition, an acidulant, an antioxidant, salt, fragrance, bittering agent, enrichments (vitamins), and pH adjustors used in normal beverages may be added as necessary to the beverage of the present invention as long as the beverage maintains fruit savor and stays colorless and transparent.

<Container-Packed Beverage>

The beverage of the present invention is suitable for packing in a container that can be used for drinking by putting the mouth directly on the opening of the container, such as a molded container consisting mainly of polyethylene terephthalate, or the so-called PET bottle, since it is characterized by providing a strong sense of aroma (return aroma) even when it is drunk from a packed state in a container having a small opening relative to the surface of the beverage.

A container having a small opening is a container having a drinking hole that is 1200 $mm^2$ or smaller, preferably 1000 $mm^2$ or smaller, more preferably 900 $mm^2$ or smaller, especially preferably 800 $mm^2$ or smaller. Containers for beverages with such small openings include a PET bottle or bottled can equipped with a cap ($\varphi$28 mm, $\varphi$38 mm), an aluminum can or steel can equipped with partial open end lids that opens partly, such as the pull-tab type or the stay-on-tab type, a paper pack with a straw, and a chilled cup with a straw. As shown in the Examples given hereinafter, when a beverage is drunk by being packed in a container with a small opening like a PET bottle or a bottle can, the aroma tends to be felt weakly since the aroma from the surface of the beverage does not enter the nose directly compared to when a container with a large opening such as a cup is used. However, with the beverage of the present invention, it is possible to feel the fresh aroma of a fruit similar to when drinking a straight juice by a cup, even when the beverage is packed in a container with a small opening.

The beverage of the present invention can maintain the colorless and transparent quality even when it is put under light, so a transparent container that allows the colorless and transparent quality of the beverage to be viewed, such as a PET bottle, is a preferable aspect of the container-packed beverage of the present invention. In particular, the effect of the present invention may be maintained even in a transparent container that transmits oxygen.

The beverage of the present invention provides coolness and has a colorless and transparent liquid color, and it has a high drinkability that allows drinking large amounts at one time (drinking in a gulp). Since the beverage may be drunk without tiring even when it is drunk in a large amount, it is suitable for packing in a container of 350 mL to 2000 mL, preferably 500 mL to 1000 mL.

EXAMPLES

The present invention is explained by Examples below without being limited thereby.

<Quantification Method of Valencene and Linalool in Beverage>

The concentrations (mg/L) of valencene and linalool in the beverage (sample solution) were measured by the following method using a GC/MS measurement device:

The sample solution (5 ml) was poured in a vial (volume 20 ml) to which 1.5 g of NaCl was added, and the mixture was agitated at 40° C. for 20 min., then 1 ml of gas phase at the head space section was collected to be subjected to GC/MS measurement. The mass of each constituent per volume of sample solution was calculated from the obtained value and determined as the concentration of each constituent. The GC/MS measurement condition is as shown below.
Device: GC: GC6890N by Agilent Technologies
MS: 5973 inert by Agilent Technologies
HS: MPS2 by Gerstel
Column: Inert Cap pure WAX 30 m×0.25 mmi.d. df=0.25
Quantified ion: linalool m/z=93, valencene m/z=161
Temperature condition: 40° C. (5 min.) to 10° C./min. to 260° C.
Carrier Gas Flow Rate: He 1.2 ml/min.
Introduction Method: Split 1:20
Inj temperature: 200° C.
IF temperature: 260° C.
Ion source temperature: 230° C.

Example 1

Figure 2:
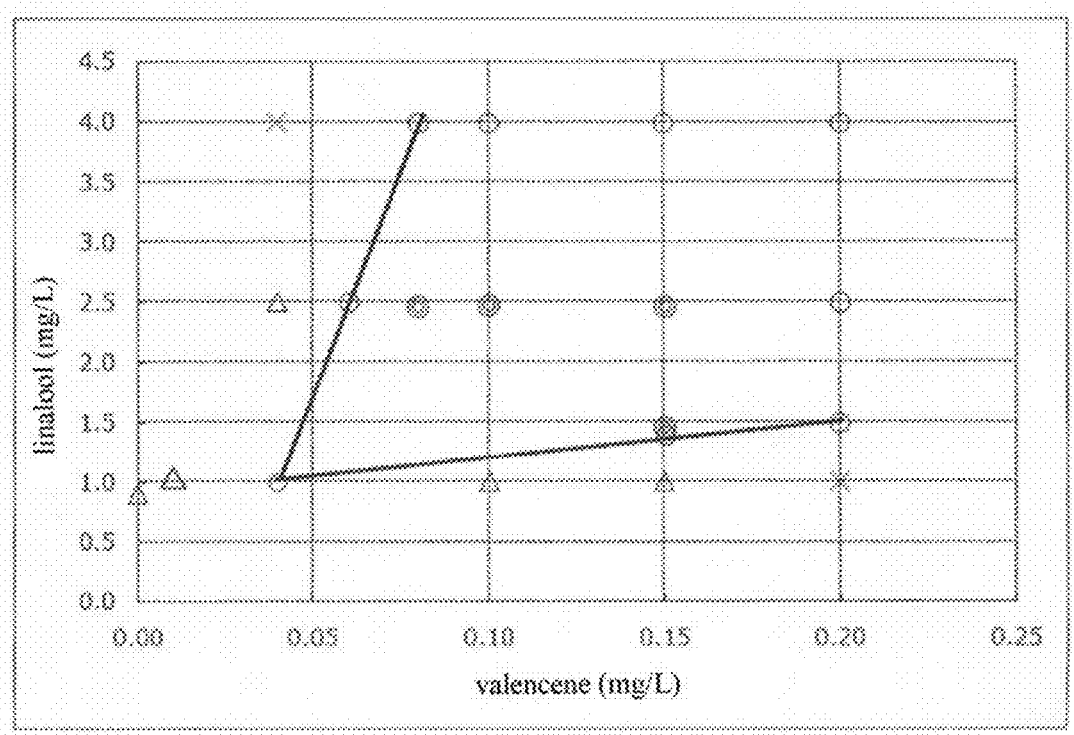
FIG. 2 is a graph of Test Products 1 to 20 and Commercial Product 1 shown in the Examples with the concentration of valencene on the x axis, the concentration of linalool on the y axis, and plotting an overall desirability as a beverage that is 4 points or higher as "⊚", an overall desirability as a beverage that is 3.5 points or higher and lower than 4 points as "○", 3 points or higher and lower than 3.5 points as "Δ", and lower than 3 points as "x". The two straight lines in the graph of FIG. 2 represent y=3.1x+0.85 and y=75x−2.0.

To a solution adjusted to Brix 4.5 by adding granulated sugar to water was added 1.2 mass % of citric acid, then trisodium citrate was added thereto to obtain a pH of 3.6. To the mixture, linalool and valencene were respectively added to the concentrations shown in Table 1 below (unit: mg/L) to formulate Test Products 1 to 19. The obtained Test Products 1 to 19 all have a "colorless and transparent" appearance like water, and the absorbance by the spectrophotometer (UV-1600 (Shimadzu Corporation)) at a wavelength of 660 nm was 0.6 or lower, the ΔE value of the transmitted light against pure water by colorimetric color difference meter (ZE 2000 (Nippon Denshoku Industries Co., Ltd.)) was 1.2 or lower. These test products were filled in PET bottles, and the intensity of aroma when the beverage was drunk directly from the PET bottle, the fruity taste and the overall desirability as a beverage were assessed by 3 panelists on a scale of 5 from 5 to 1, with "5" being the best (strong aroma, strong taste, desirable overall) and "1" being the worst (weak aroma, weak taste, undesirable overall). The average score of the assessment is shown in Table 1. Furthermore, graphs plotting an intensity of aroma that is 4 points or higher as "◉", an intensity of aroma that is 3.5 points or higher and lower than 4 points as "○", 3 points or higher and lower than 3.5 points as "Δ", and lower than 3 points as "x" are shown in FIGS. 1 and 2. FIG. 1 is the assessment result of the "intensity of aroma" and FIG. 2 is an assessment result of the "overall desirability as a beverage." The straight line in the graph of FIG. 1 shows y=3.1x+0.85, and the two straight lines in the graph of FIG. 2 show y=3.1x+0.85 and y=75x−2.0. When the average score of the assessment is 3.5 or higher (i.e. ○ or ◉), the subject is acceptable.

TABLE 1

|  | Test Product 1 | Test Product 2 | Test Product 3 | Test Product 4 | Test Product 5 | Test Product 6 | Test Product 7 | Test Product 8 | Test Product 9 | Test Product 10 |
|---|---|---|---|---|---|---|---|---|---|---|
| valencene | 0.04 | 0.10 | 0.15 | 0.20 | 0.20 | 0.04 | 0.10 | 0.20 | 0.04 | 0.08 |
| linalool | 1.0 | 1.0 | 1.0 | 1.0 | 1.5 | 2.5 | 2.5 | 2.5 | 4.0 | 4.0 |
| intensity of aroma | 3.7 | 3.2 | 3.1 | 3 | 3.5 | 4.5 | 4.2 | 4 | 4.5 | 4.3 |
| fruity taste | 3.3 | 3.3 | 3 | 2.8 | 3.5 | 2 | 5 | 3.5 | 1 | 3 |
| overall assessment | 3.5 | 3.3 | 3.1 | 2.9 | 3.5 | 3 | 4.6 | 3.8 | 2.8 | 3.5 |
| free comment | top aroma is vivid | return aroma is bit weak and heavy | return aroma is weak and heavy | feel almost no return aroma | feel natural return aroma of fruit | top aroma is bit artificial | strong and vivid return aroma | strong and vivid return aroma | top aroma is strong but artificial | strong and vivid return aroma |
|  | feel a fruity thickness | feel a fruity taste | feel some acridity in aftertaste | feel strong acridity in aftertaste | feel a fruity taste | strong aroma but poor fruity taste | fully feel fruity taste | fully feel fruity taste | strong aroma but poor fruity taste | feel fruity taste |

|  | Test Product 11 | Test Product 12 | Test Product 13 | Test Product 14 | Test Product 15 | Test Product 16 | Test Product 17 | Test Product 18 | Test Product 19 |
|---|---|---|---|---|---|---|---|---|---|
| valencene | 0.10 | 0.20 | 0.15 | 0.15 | 0.06 | 0.06 | 0.15 | 0.15 | 0.01 |
| linalool | 4.0 | 4.0 | 4.0 | 1.4 | 2.5 | 2.5 | 2.5 | 1.5 | 1.0 |
| intensity of aroma | 4.2 | 4 | 3.8 | 3.9 | 4.4 | 4.3 | 4.3 | 4.1 | 3.5 |
| fruity taste | 3.4 | 5 | 4 | 3.6 | 2.5 | 3.5 | 4 | 3.7 | 3.2 |
| overall assessment | 3.7 | 3.8 | 3.5 | 3.7 | 3.5 | 4 | 4.2 | 4 | 3.3 |
| free comment | strong and vivid return aroma | strong and vivid return aroma | strong and vivid return aroma | feel natural return aroma of fruit | strong and vivid return aroma | strong and vivid return aroma | strong and vivid return aroma | feel natural return aroma of fruit | top aroma is vivid |

TABLE 1-continued

| feel fruity taste | fully feel fruity taste | fully feel fruity taste | feel taste of fruit juice | feel fruity taste | fully feel fruity taste | fully feel fruity taste | feel taste of fruit juice | fruity taste is bit weak |
|---|---|---|---|---|---|---|---|---|

From the results in Table 1 and FIG. 1, it can be seen that when the valencene and linalool have concentrations satisfying the formula "X≥0.01" and "Y≥3.1X+0.85" given that the concentration of valencene is X (mg/L) and the concentration of linalool is Y (mg/L), the aroma (return aroma) is felt strongly even when the beverage is drunk directly from a container having a small opening like a PET bottle.

Also, the result of Table 1 and FIG. 2 shows that when the valencene and linalool has concentrations that satisfy the formula "Y≤75X−2.0," it allows the fruity taste to be felt in addition to the richness of the return aroma, and the overall desirability as a beverage increases.

Example 2

To a solution adjusted to Brix 4.2 by adding fructose, granulated sugar, fructose grape sugar liquid sugar to water was added citric acid, trisodium citrate and vitamin C so that the total acidity was 0.14% when converted to citric acid. To the mixture, concentrated orange fruit juice was added to a straight converted value of 1%, then salt and fragrance were added to obtain Test Product 20. The result from measuring linalool and valencene of Test Product 20 by the above method is shown in Table 2 (unit: mg/L). Furthermore, the Brix value measured using a refractometer for sugar is also shown in Table 2. The obtained Test Product 20 has a "colorless and transparent" appearance like water, and the absorbance by the spectrophotometer (UV-1600 (Shimadzu Corporation)) at a wavelength of 660 nm was 0.06 or lower, and the ΔE value of the transmitted light against pure water according to the colorimetric color difference meter (ZE 2000 (Nippon Denshoku Industries Co., Ltd.)) was 1.2 or lower.

Test Product 20 was assessed for intensity of aroma, a fruity taste, and an overall desirability as a beverage similar to Example 1 in cases of drinking the beverage by pouring it into a cup, and of drinking the beverage directly from a PET bottle by filling it in a PET bottle. The different sensory assessments were also similarly performed of commercial near-water that contains fruit (mandarin) extract (Commercial Product 1) (having a colorless and transparent appearance like water), in cases of drinking the beverage by pouring it into a cup, and of drinking the beverage directly from a PET bottle. In addition, the amount of valencene and linalool of Commercial Product 1 were measured by the above method, and the Brix value was measured using a spectrophotometer for sugar. The result is shown in Table 2, FIGS. 1 and 2.

TABLE 2

| | Drink from cup | | Drink from PET bottle | |
|---|---|---|---|---|
| | Test Product 20 | Commercial Product 1 | Test Product 20 | Commercial Product 1 |
| valencene | 0.08 | 0.00 | 0.08 | 0.00 |
| linalool | 1.6 | 0.8 | 1.6 | 0.8 |
| Brix | 4.6 | 4.5 | 4.6 | 4.5 |
| intensity of aroma | 4.4 | 4.3 | 4.5 | 3.2 |
| fruity taste | 4 | 3.8 | 4.2 | 3.2 |
| overall assessment | 4.2 | 4.1 | 4.6 | 3.2 |
| free comment | feel natural aroma of fruit fully feel fruity taste | feel natural aroma of fruit feel a fruity taste | strong and vivid return aroma fully feel fruity taste | return aroma is quite weak feel a weak fruity taste |

From the result of Table 2, FIG. 1 and FIG. 2, it can be seen that in Commercial Product 1 in which valencene and linalool do not satisfy the formula "Y≥3.1X+0.85" when the concentration of valencene is X (mg/L), and the concentration of linalool is Y (mg/L), a fruity aroma and taste are felt when the beverage is drunk from a cup, but the aroma and the fruity taste become weak when the beverage is drunk directly from a PET bottle. On the other hand, in Test Product 20 that satisfies formulas "X≥0.01" and "Y≥3.1X+ 0.85," the aroma and taste of fruit are felt strongly both when the beverage is drunk from a cup, and when the beverage is drunk directly from a PET bottle. It was found especially for Test Product 20 that the scores are surprisingly higher for all of the intensity of aroma, the fruity taste, and the overall assessment when the beverage is drunk directly from a PET bottle compared to when it is drunk from a cup.

Test Product 20 was a beverage having a "colorless and transparent" appearance like water, but allowing a return aroma (aroma traveling from the mouth to the nose) to be felt strongly so that the fruity taste was felt fully, even when a beverage was drunk from a PET bottle (a container with a small opening). In addition, although a fruity taste was felt fully while the beverage was being drunk, the sweetness did not remain in the mouth for long, so the aftertaste was crisp. On the other hand, Commercial Product 1 allowed the aroma and fruity taste to be felt when the beverage was drunk from a cup, but the aroma (return aroma) as well as the fruity taste was weak when the beverage was drunk from a PET bottle (a container with a small opening). It also left behind a flat sugar-like sweetness as the aftertaste.

Reference Example

Concerning a common commercial orange fruit beverage (20 to 100% fruit juice, not colorless and transparent) (Commercial Products 2 to 4), the amounts of valencene and linalool were measured by the above method. Furthermore, the Brix was measured using a refractometer for sugar. The result is shown in Table 3.

TABLE 3

|  | Commercial Product 2 | Commercial Product 3 | Commercial Product 4 |
|---|---|---|---|
| valencene | 1.60 | 0.80 | 0.70 |
| linalool | 1.1 | 0.6 | 1.0 |
| Brix | 11.8 | 10.8 | 10.8 |

Like Commercial Product 1, none of Commercial Products 2 to 4 (normal orange fruit beverage, fruit juice 20 to 100%, not colorless and transparent) satisfy the formula "Y≥3.1X+0.85" when the valencene concentration is X (mg/L) and the linalool concentration is Y (mg/L).

The invention claimed is:

1. A beverage that is given a fruit savor by adding fruit fragrance and that satisfies requirements (A) and (B):
    (A) the beverage contains valencene and linalool as aromatic constituents, and satisfies formulas below:

$X \geq 0.01$ $Y \geq 3.1X + 0.85$ (X: valencene concentration (mg/L), Y: linalool concentration (mg/L)); and
    (B) a color of the beverage satisfies the following:
    absorbance at a wave length of 660 nm≤0.06,
    ΔE value (color difference) based on pure water≤3.5.

2. The beverage according to claim 1, wherein the ΔE value (color difference) based on pure water is 1.2 or lower.

3. The beverage according to claim 1, wherein the beverage satisfies Y≤75X−2.0.

4. The beverage according to claim 1, comprising linalool at a concentration of 4.0 mg/L or lower.

5. The beverage according to claim 1 comprising valencene at a concentration of 0.2 mg/L or lower.

6. The beverage according to claim 1 further containing a sweetening constituent, wherein the beverage has a Brix value of 3.0 to 6.0.

7. The beverage according to claim 1, which is a container-packed beverage packed in a container having an opening of 1200 mm² or smaller that serves as a mouth for drinking.

* * * * *